June 29, 1948.  D. B. McAULAY  2,444,055
CARGO SNUBBER

Filed Sept. 13, 1946  2 Sheets-Sheet 1

Inventor
DAVID B. McAULAY

By M. Hayes

Attorney

June 29, 1948.  D. B. McAULAY  2,444,055
CARGO SNUBBER
Filed Sept. 13, 1946  2 Sheets-Sheet 2

Inventor
DAVID B. McAULAY

By
M. Q. Hayes
Attorney

Patented June 29, 1948

2,444,055

UNITED STATES PATENT OFFICE 2,444,055

CARGO SNUBBER

David B. McAulay, Bethesda, Md.

Application September 13, 1946, Serial No. 696,979

2 Claims. (Cl. 214—95)

(Granted under the act of March 3, 1883, as amended April 30, 1928; 370 O. G. 757)

This invention relates to hoist guiding devices and in particular to a movable guided member which is adapted to hold a loaded cargo sling clear of obstructions, as it is either hoisted from or lowered into the hold of a ship.

Risk of damage to cargo and injuries to personnel is ever present in the present-day methods of loading and unloading ships in rough weather. In the recent war, particularly in amphibious operations, much damage was caused to the cargo and many serious casualties to personnel were inflicted by reason of the lack of suitable means for guiding a loaded cargo sling through the hatchways of the different decks. In many instances the slings were caught on the hatch coamings and were torn to such an extent that the cargo spilled out or was otherwise damaged. Furthermore, the rate of loading or unloading was greatly reduced.

With these difficulties in view it is therefore an object of this invention to provide movable means for guiding a loaded cargo sling which will hold the sling clear of obstructions as it is hoisted or lowered.

It is also an object of this invention to provide movable means for guiding a loaded cargo sling which (means), by reason of prevention of entanglement of the loaded slings with hatchway coamings or other obstructions, expedites the handling of the cargo.

It is a further object of this invention to provide movable means for guiding a loaded cargo sling which (means), by reason of the prevention of the entanglement of the loaded sling with hatchway coamings or other obstructions, prevents damage to the cargo.

It is an additional object of this invention to provide movable means for guiding a loaded cargo sling, which (means), by reason of the prevention of the entanglement of the loaded sling with hatchway coamings or other obstructions, reduces the risk of injury to personnel handling the cargo.

These and other objectives will be apparent from the following description and from the drawings which are illustrative of the preferred embodiment of applicant's invention, and in which Figure 1 is a side elevation of the movable snubber shown mounted on a monorail.

Figure 1:
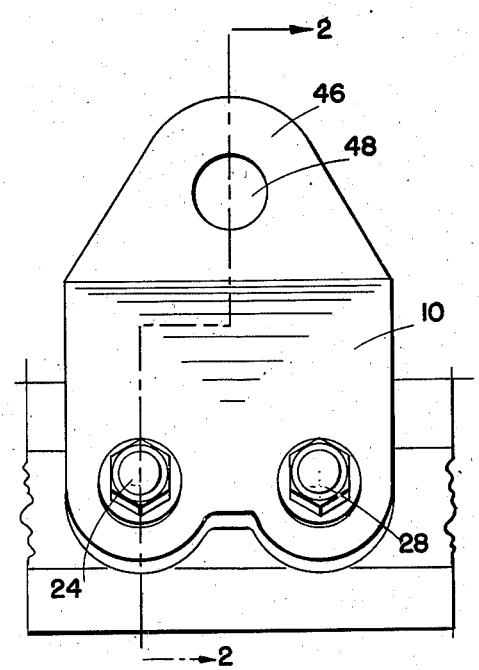
Figure 2:
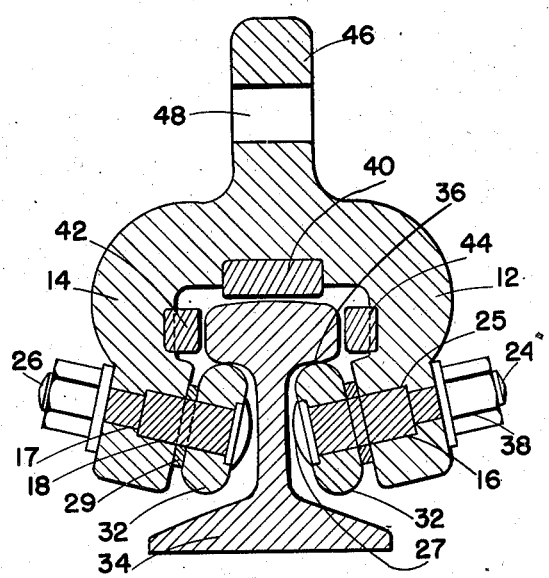
Figure 2 is a sectional view taken along line 2—2 of Figure 1, showing the relationship of the snubber shoe to the monorail and the construction by which this relationship is made movable.
Figure 5:
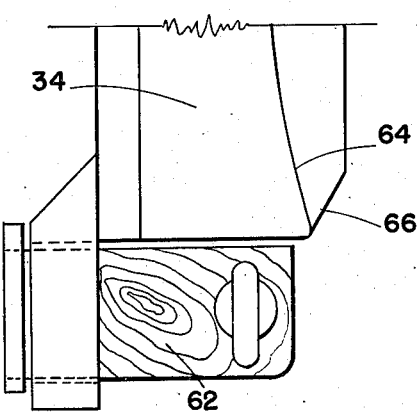
Figure 5 is a side elevation of the hard wood sliding stopper, positioned at the bottom of the monorail.
Figure 6:
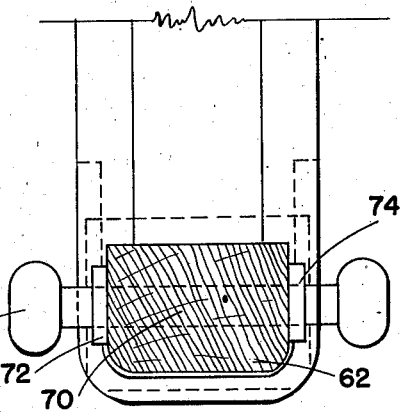
Figure 6 is a front elevation of the same.
Figure 3:
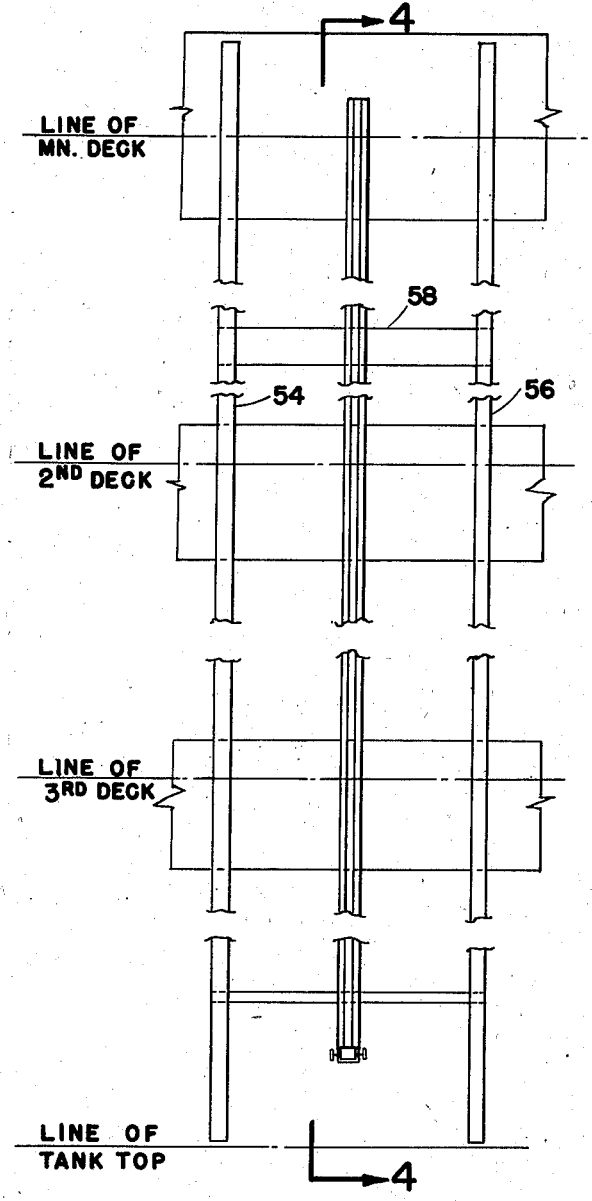
Figure 3 is a front elevation of the monorail and its supporting structure.
Figure 4:
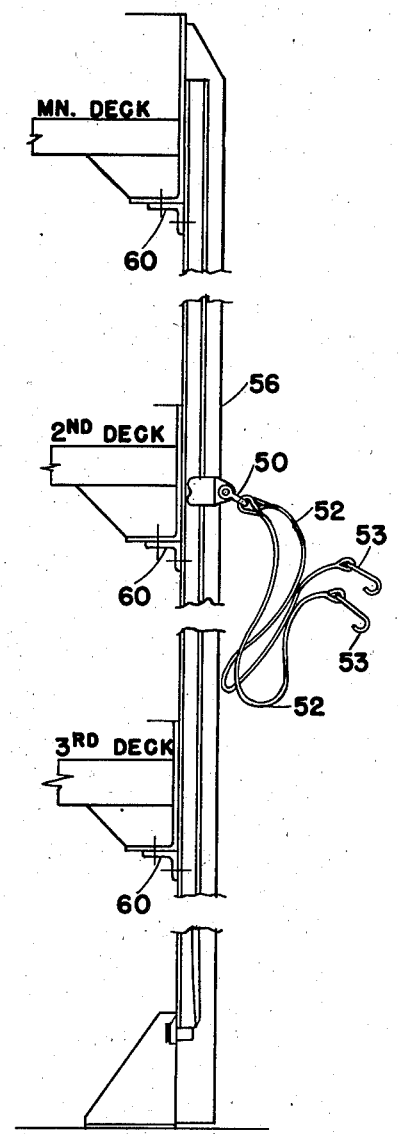
Figure 4 is a sectional view taken along line 4—4 of Figure 3, showing constructional details of the monorail support and the movable snubber with attached pendants in position.

In Figure 1, 10 represents the snubber shoe which is Y shaped in cross-section, as shown by Figure 2. The legs 12 and 14 of the Y are provided for bearing 16, 18, 20, and 22, in which stub shafts 24, 26, 28, and 30 fit. There are two of such bearings and stub shafts in each leg of the snubber shoe. Each bearing is provided with an offset or shoulder 17, which acts as an abutment for shoulder 25 on the stub shaft. Shoulders 17 and 25 in conjunction with 38 function to hold stub shafts 24, 26, 28, and 30 firmly in position. Each stub shaft is provided with an upset head 27 and washer 29 between which rollers such as 32 are free to rotate. The legs of the snubber shoes are inclined to the vertical longitudinal medium plane therethrough, so that these rollers bear on the reverse surface of the head of the T or monorail 34 as of 36. The snubber shoe is provided in its interior cavity with bronze wearing strips 40, 42, and 44 which are adapted to contact the head of the T rail in guiding the shoe and to reduce friction between the shoe and the rail. The stem of the Y of the shoe constitutes an ear or lug 46 which is provided with a hole 48 extending therethrough. Ear 46 supports shackle 50 by means of a shackle bolt extending through hole 48. Snubber shoe 10 slides freely along monorail 34. The latter is held in vertical position by a ladder construction provided with side rails 54 and 56 and cross members 48. Monorail 34 may be welded to cross members 58. The assembled ladder and monorail structure is held in position by clip angles 60, which are attachable to the various deck structures. Siderails 54 and 56 project beyond the plane of the extreme transverse surface of the monorail. They function as a guard in preventing a loaded sling from coming into contact with the hatch coamings, as it moves from deck to deck. Both the ladder structure and the monorail extend above the main decks.

At least two wire pendants 52 may be attached to shackle 50 by means of appropriate thimbles. Open type hooks 53 are attached to the free ends of these pendants. The pendants are of sufficient overall length to reach about one-half of the distance around the loaded sling.

At the lower end of monorail 34 may be provided a slidable stopper block 62. This block is carried in a stirrup 64 which is attached to monorail 34. Stopper block 62 functions to prevent movable snubber 10 from becoming detached from monorail 34 when the snubber is at the bottom of its travel. The stopper block is made slidable so that it can be moved into the clear when it is necessary to place a snubber in operating position on the monorail. This operation is further assisted by chamfering the ends of the rail as in 64 and 66. Stopper block 62 is also provided with handling means 66. This comprises a bolt 70 extending through stopper block 62 which is provided with streamlined heads on either end, which are adapted to threadedly engage the bolt. These heads are streamlined to prevent entanglement with the sling. Bolt 70 is held in position with respect to block 62 by means of washers 72 and 74 which threadedly engage the bolt, and bear on the side faces of the block. These washers, when turned into position to grip the block firmly, may be spot welded in that position.

In operation, after a snubber shoe with its attached pendants has been placed on the monorail, a loaded sling is moved over close to the snubber shoe and the hooks of the pendants may be hooked into the mesh of the sling, preferably on the side of the sling opposite from the snubber shoe. As the loaded sling is hoisted the snubber shoe travels up the monorail at the same time holding the sling close to it and preventing the sling from swinging from side to side with the roll of the ship. The sling cannot become entangled with either the hatchway coamings or the monorail and its supporting structure. As the loaded sling passes above the main deck the snubber shoe passes off from the upper end of the monorail. The derrick boom may be now traversed and the load deposited wherever it is desired. When an empty sling is returned, the snubber shoe may still be attached to it. If so, the snubber shoe is placed on the monorail manually and as the sling is lowered into the hold, the snubber shoe travels down the monorail until it strikes on the stopper block at the bottom end thereof. It is readily apparent that, by preventing the loaded sling from becoming entangled on obstructions along its line of travel, much time is saved in the operation and the hazard is greatly reduced.

While the foregoing description has been limited to the applications of applicant's invention to structure associated with the hoisting of ship cargo, it is not desired to be strictly limited thereto as the inventions may be used in other operations where it is necessary to hold the load being hoisted in line. Such other applications are included within the scope of this invention to the extent as defined by the herewith attended claims.

The invention described herein may be manufactured and used by or for the Government of the United States of America for governmental purposes without the payment of any royalty thereon or therefor.

I claim:

1. A snubber device for guiding a loaded hoisting sling as it is hoisted comprising a monorail fixed in a vertical position, a snubber shoe movably connected to the monorail adapted to move therealong as the loaded hoisting sling is hoisted, said shoe adapted to be removable from said monorail at the upper end of its travel, and means connected to the snubber shoe adapted to hold the loaded hoisting sling and prevent its swaying as it is hoisted.

2. A snubber device for guiding a loaded hoisting sling as it is hoisted comprising a monorail fixed in vertical position, a roller bearing snubber shoe movably connected to the monorail adapted to move therealong as the loaded hoisting sling is hoisted, and at least two pendants provided with hooks connected to the snubber shoe adapted to hold the loaded hoisting sling by means of hooked engagement therewith and prevent its swaying as it is hoisted.

DAVID B. McAULAY.

REFERENCES CITED

The following references are of record in the file of this patent:

UNITED STATES PATENTS

| Number | Name | Date |
|---|---|---|
| 1,961,753 | Fish | June 5, 1934 |
| 2,280,396 | Gentry | Apr. 21, 1942 |

FOREIGN PATENTS

| Number | Country | Date |
|---|---|---|
| 565,076 | France | Nov. 3, 1923 |